UNITED STATES PATENT OFFICE 2,109,340

NEW CATALYSTS

Julius A. Nieuwland and Frank J. Sowa, Notre Dame, Ind., assignors to E. I. du Pont de Nemours & Company, Wilmington, Del., a corporation of Delaware No Drawing. Application October 11, 1934, Serial No. 747,892

16 Claims. (Cl. 23—152)

This invention relates to new catalysts for condensation reactions of hydrocarbons. Still more particularly it relates to new derivatives of boron fluoride, applicable for the catalysis of condensation reactions of olefines and acetylenes. Still more particularly it relates to an improved method for using boron fluoride as a catalyst.

The use of boron fluoride for catalytic reactions of acetylenes and olefines has been described by numerous authors, among them particularly are Nieuwland and co-workers (U. S. Patent 1,907,560; J. Amer. Chem. Soc. 54, 2019; 54, 3694; 55, 2857; 55, 3402); Fritz Hofmann and Carl Wulff assignors to I. G. Farbenind. Akt.-G. (U. S. 1,898,627); Hoffmann and Michael Otto, assignors to I. G. Farb. Akt. (U. S. 1,885,060 and 1,811,130) and Walter Weibezahn to I. G. Farb. Akt.-G. (U. S. 1,912,608). In general, these disclosures follow the practice of adding boron trifluoride to the reaction mass, though the conditions are generally such that fluoboric acids are formed in the reaction mixture, and in patents granted to Nieuwland, the direct use of fluoboric acids is mentioned Boron fluoride is a corrosive gas of low boiling point which is difficult to prepare and handle. Further, it is a highly active polymerizing agent and in some cases with oxygen-containing organic compounds, its use results in charring.

One object of this invention has been the discovery of a compound containing boron fluoride which may be more readily and efficiently prepared; another object is the preparation of boron fluoride in a form in which it may be conveniently handled, measured and transported; a further object is to prepare a compound of boron fluoride which is moderated in its vigor as a polymerization catalyst and charring agent. Other objects will appear hereinafter.

The objects of this invention have been accomplished through the isolation and application of a compound of boron fluoride which we have named dihydroxyfluoboric acid and related complex compounds consisting of addition compounds of dihydroxyfluoboric acid with boron fluoride.

Several complex acids derived from boron fluoride have been described in the literature (Bor. Gmelins Handbuch der Anorganischen Chemie, 8 Auflage, 1926, Verlage Chemie G. m. b. H., Leipzig-Berlin, pp. 116–17; Treatise on Inorganic and Theoretical Chemistry, J. W. Mellor, Vol. V, 1924, Longmans, Green and Co., London, pp. 123 to 129), but none has described an acid with the properties of dihydroxyfluoboric acid and their practical application is very little known.

Dihydroxyfluoboric acid, believed to be $H_3BO_2F_2$, may be prepared by two types of reactions. First, it may be prepared by the reaction of boron fluoride upon solid boric acid, $H_3BO_3$. The reaction is believed to be:

The following example will illustrate the method.

Example 1

An excess of $BF_3$ is very slowly passed into solid $H_3BO_3$, using a suspension medium which is inert if desired. Suitable suspension media are the higher saturated hydrocarbons as, for example, heptane, octane, etc. During the first part of the reaction, hydrogen fluoride is given off and must be allowed to escape with a small amount of the $BF_3$. At the end of the reaction, the mass is distilled and fractionated, leaving a residue of metaboric acid, $HBO_2$. This method is not very satisfactory since boron fluoride must be prepared first.

A second method, which is more satisfactory, is accomplished by passing anhydrous hydrofluoric acid into boric oxide. The reaction, which is illustrated in Example 2, is believed to be:

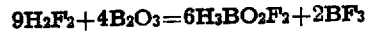

Example 2

Five hundred and seventy-three grams of boric oxide are weighed into a bronze reaction vessel. Anhydrous hydrogen fluoride is passed in until an increase in weight slightly less than that indicated by the equation above is produced. The reaction becomes warm and unless cooled, boron fluoride will be driven off; $BF_3$ will be retained, however, by the dihydroxyfluoboric acid if the reaction mass is cooled. Pure products may be obtained by distillation of this material, but it may be used as obtained from the reaction for many purposes. For maximum yields, the $H_2F_2$ addition should be stopped before the boric oxide is consumed, thus in this example, if the absorption is carried only to 80% of the theory and the products recovered by redistillation, the yield is found to be 93% of the theory, based on materials consumed. Thus, from the above equation theoretically 9/4 mols of $H_2F_2$ will react with 1 mol. of $B_2O_3$ and approximately 80% of 9/4 mols or 1.8 mols give maximum yield.

A modification of this process occurs in the customary manner of preparing boron fluoride by the action of sulfuric acid on boric oxide and calcium fluoride. Sulfuric acid and calcium fluoride liberate hydrogen fluoride which reacts with the boric oxide. As carried out in the past, this has been warmed sufficiently to take off boron fluoride, but no one has investigated the additional formation of dihydroxyfluoboric acid, which we have discovered may be distilled out of the reaction mixture after the removal of $BF_3$. Although calcium fluoride is for certain reasons preferred over other materials, it is to be understood that any fluoride of an alkaline reacting metal, e. g., an alkali or an alkaline earth fluoride may be used with sulfuric acid and boric oxide in place of calcium fluoride mentioned above. As indicated this method is essentially the same as the one illustrated by Example 2, the only difference being that instead of adding $H_2F_2$ itself, substances, e. g., sulfuric acid and a fluoride of an alkaline reacting metal, which when brought together produce $H_2F_2$, are added to the reaction mixture and thus the $H_2F_2$ is formed in situ.

Dihydroxyfluoboric acid prepared by the above methods is a syrupy liquid analyzing to correspond to the formula $H_3BO_2F_2$, or if preferred, $HBO_2.2HF$. The molecular weight by vapor density measurement indicates dissociation in the vapor state into two molecules, giving a figure of approximately 41.9 instead of 83.8 as calculated from the above formulae. Dihydroxyfluoboric acid distills at 159 to 160° C. and has a boiling point of 159.1° C. at 744 mm. and 69° C. at 4 mm.; its specific gravity has been found to be 1.6569 at 25° C. and 1.5639 at 30° C. The conductivity of the pure product compares favorably with concentrated sulfuric acid. It has been found to be soluble in acetic acid, aniline and phenol; it is insoluble in carbon tetrachloride, carbon bisulfide and benzene. The new acid reacts normally with metals, liberating hydrogen with Na, Ca, Mg, Zn etc.; it is decomposed by water giving a solid compound which when washed with ether and dried proves to be metaboric acid.

While several formulas have been suggested for the new compound, its precise structural formula has not been determined with certainty. Wherever in the specification and claims the term "dihydroxyfluoboric acid" appears, it is used to mean a compound having the characteristics herein described, to the exclusion of all other compounds to which this name could possibly be applied.

Dihydroxyfluoboric acid absorbs up to one mole of $BF_3$ for each mole of pure acid and this is again liberated upon heating to a temperature somewhat below the boiling point of the dihydroxyfluoboric acid; further, the pure acid itself decomposes with the liberation of $BF_3$ when warmed with concentrated sulfuric acid. It is upon the basis of these facts that we find especial value for the new product as a means of readily handling, measuring and transporting boron fluoride. The pure acid may be charged with an equivalent of $BF_3$ or it may be used itself; in either case, the theoretical quantity of $BF_3$ is readily obtained simply by warming and treating with sulfuric acid. It is further to be understood, as will be demonstrated by the examples, that the acid, with or without excess $BF_3$, may generally be used in place of $BF_3$ in those reactions where the latter functions as a catalyst. In fact the acid and its addition product with $BF_3$ are generally useful in two ways. They are an excellent source of boron fluoride, yielding this material in measured quantities upon heating or upon treating with sulfuric acid as outlined above. In addition, however, the acid and its addition product, may both be used, as such, as catalysts in place of boron fluoride with excellent results, without subjecting the acid or its addition product to heat and the action of sulfuric acid, or either, to release boron fluoride. The following examples illustrate the manner in which the acid may be used as a source of supply of boron trifluoride.

*Example 3*

Pure dihydroxyfluoboric acid, $H_3BO_2F_2$, is weighed into a generator equipped with a gas delivery tube and a device for introducing concentrated sulfuric acid. The mass is warmed by means of steam and sulfuric acid is slowly dropped in, boron fluoride being rapidly evolved in an amount equivalent to the fluorine in the acid originally taken. The boron fluoride evolved from 252 gm. of dihydroxyfluoboric acid (nearly 130 gm.) is continuously passed into 1300 gm. of ethylene which is then enclosed in a reaction vessel under pressure of approximately 1000 lbs. The ethylene is polymerized to a liquid hydrocarbon, the yield depending upon the time permitted for the reaction to progress.

*Example 4*

Dihydroxyfluoboric acid, previously charged with boron fluoride at room temperature and pressure and having a composition corresponding to $H_3BO_2F_2.BF_3$, is weighed into a gas generator and heated by means of superheated steam. Without the addition of sulfuric acid, 300 gm. of this compound will evolve approximately the same weight of $BF_3$ as was obtained in Example 3 and the acid may be recharged with $BF_3$ for further use. It may be used for the polymerization of ethylene or propylene as described before.

*Example 5*

Example 4 is repeated, but sulfuric acid is added to the heated $H_3BO_2F_2.BF_3$ giving off $BF_3$ which is used as before. In this case, 460 g. of the acid compound gives over 300 g. of $BF_3$.

Boron fluoride generated in this manner, the addition compound of boron fluoride believed to be $H_3BO_2F_2.BF_3$, or the new acid itself may be used for any of the reactions in which $BF_3$ serves as a catalytic agent or in the formation of a catalytic agent. For example, the polymerization of olefines, the condensation of acetylenes with hydrocarbons, acids, etc. to form vinyl derivatives, the condensation of olefines with phenols to form phenol ethers and alkylated phenols, and other well known applications where boron fluoride is now used. The following reactions are a few chosen at random.

*Example 6*

Two parts of dihydroxyfluoboric acid was added to a mixture of 60 parts of acetic acid and 46 parts of ethanol. The mixture was refluxed for 1 hour and then distilled giving 42 parts of ethyl acetate. Similar quantities of acetic acid and ethanol were again added to the residue from the distillation and the refluxing repeated giving a similar quantity of ethyl acetate. After eight repeated esterifications carried out in this manner, the dihydroxyfluoboric acid was recovered from the residue by distillation for future use.

A longer period of refluxing, for example 5 to 6 hours, will give a higher conversion to ester, for example 50 to 60 parts by weight.

In a similar manner, this process can be applied to the preparation of methyl and isopropyl acetates, methyl benzoate and methyl anthranilate.

Example 7

One mole of acetic acid and 2 grams of dihydroxyfluoboric acid are weighed into an absorption flask which is swept and placed under a slight pressure of butylene. The flask was shaken and maintained at 25–30° C. until 10 grams of butylene were absorbed. The contents were neutralized with Na₂CO₃, dried over calcium chloride and distilled, fractionating out 16 grams of tertiary butyl acetate.

The use of higher pressures with agitation favors the formation of higher yields of ester. This process may be applied to the esterification of acetic acid with butylene, propylene, amylene, vinyl chloride, etc.

Example 8

Seventy grams of isopropyl phenyl ether was refluxed with 5 grams of dihydroxyfluoboric acid for 1 hour. Following the usual method of separation, 60 g. of 2- and 4-isopropylphenol were obtained.

Example 9

Ninety-four grams of phenol and 5 grams of dihydroxyfluoboric acid were agitated under an atmosphere of propylene at 30–35° C. When 25 grams of propylene had been absorbed, the mixture was treated according to the usual procedure and 45 grams of isopropyl phenols were isolated together with a small amount of isopropyl phenyl ether.

Example 10

One mole of dry benzene and 2 grams of dihydroxyfluoboric acid were agitated under an atmosphere of butylene until an increase in weight of 32 grams had been observed. Separation of the products gave 18 grams of mono- and 5 grams of di-butylbenzene.

Example 11

One part of mercuric oxide and one part of dihydroxyfluoboric acid were added to 100 parts of acetic acid and vinyl-acetylene was passed in at 25–30° C. After neutralizing with sodium acetate and fractionating, an 80% yield of methyl vinyl ketone and acetic anhydride was obtained according to the equation:

$$C_4H_4 + 2CH_3COOH \rightarrow CH_3COCH=CH_2 + (CH_3CO)_2O$$

From the above description and specific examples, it is obvious that dihydroxyfluoboric acid and its addition compounds with boron fluoride may replace boron fluoride in any reaction where the boron fluoride functions as a catalyst. The same conditions of temperature, time of reaction etc. apply as when boron fluoride itself is used. The dihydroxyfluoboric acid may also be used as a source of boron fluoride. The addition of heat and/or sulfuric acid releases the boron fluoride which may then be passed into the reaction mass.

Thus a means by which boron fluoride may be more readily handled and measured is provided. Its action, likewise, is more readily controlled. Moreover the new catalyst is readily prepared itself.

It is apparent that many widely different embodiments of this invention may be made without departing from the spirit and scope thereof and therefore it is not intended to be limited except as indicated in the appended claims.

We claim:

1. Dihydroxyfluoboric acid having a boiling point of 159° to 160° C. and a specific gravity of 1.657 at 25° C.

2. A boron fluoride addition product of the dihydroxyfluoboric acid of claim 1.

3. A process which comprises passing substantially anhydrous hydrofluoboric acid into substantially anhydrous boric oxide until the increase in weight indicates that approximately 1.8 mols of H₂F₂ per mol. of B₂O₃ have been added.

4. A process which comprises passing hydrogen fluoride into boric oxide until the increase in weight indicates that approximately 1.8 mols of H₂F₂ per mol. of B₂O₃ have been added and then separating a product boiling at approximately 159° C. to 160° C.

5. A process which comprises bringing together equimolal quantities of dihydroxyfluoboric acid having a boiling point of 159° to 160° C. and boron fluoride.

6. A process which comprises warming a mixture consisting of dihydroxyfluoboric acid having a boiling point of 159° to 160° C. and concentrated sulfuric acid.

7. A process which comprises reacting hydrogen fluoride with boric oxide and simultaneously maintaining the reaction mass below the temperature at which boron fluoride is evolved.

8. A process which comprises reacting hydrogen fluoride with boric oxide and sufficiently removing the heat generated by the reaction to maintain the reaction mass below the temperature at which boron fluoride is evolved.

9. A process which comprises passing hydrogen fluoride into boric oxide until the increase in weight indicates that approximately 1.8 mols of H₂F₂ per mol. of B₂O₃ has been added and maintaining the reaction mass below the temperature at which boron fluoride is evolved.

10. The mixture obtained by the process which comprises reacting hydrogen fluoride with boric oxide while maintaining the reaction mass below the temperature at which boron fluoride is evolved.

11. A process which comprises heating a composition consisting of dihydroxyfluoboric acid having a boiling point of 159° to 160° C. and a boron fluoride addition product of said dihydroxyfluoboric acid.

12. A process of producing dihydroxyfluoboric acid by reacting boric oxide with hydrogen fluoride which comprises reacting the boric oxide with hydrogen fluoride formed in situ by reacting calcium fluoride with sulfuric acid, the sulfuric acid being present in an amount not substantially in excess of that stoichiometrically required to react with the calcium fluoride present to produce hydrogen fluoride so as to prevent the decomposition of dihydroxyfluoboric acid.

13. A process which comprises reacting hydrogen fluoride with boric oxide, maintaining the reaction mass at a temperature sufficiently high to drive off the boron fluoride formed, then raising the temperature until dihydroxyfluoboric acid having a boiling point of from 159° to 160° C. distills off and recovering the hihydroxyfluoboric acid and the boron fluoride as two separate products.

14. A process which comprises passing hydrogen fluoride into boric oxide, distilling off the boron fluoride so formed, then heating until dihydroxyfluoboric acid, boiling at 159° to 160° C., distills off and recovering the dihydroxyfluoboric acid and the boron fluoride as two separate products.

15. A process which comprises heating a composition consisting of dihydroxyfluoboric acid having a boiling point of between 159° and 160° C. a boron fluoride addition product of said dihydroxyfluoboric acid and concentrated sulfuric acid.

16. The compounds of the class consisting of dihydroxyfluoboric acid having a boiling point of between 159° and 160° C. and a boron fluoride addition product of said dihydroxyfluoboric acid.

JULIUS A. NIEUWLAND.
FRANK J. SOWA.